(12) United States Patent
Elfner et al.

(10) Patent No.: US 9,221,111 B2
(45) Date of Patent: Dec. 29, 2015

(54) HAND-GUIDED POWER TOOL

(71) Applicant: Andreas Stihl AG & Co. KG, Waiblingen (DE)

(72) Inventors: Jörg Elfner, Leutenbach (DE); Tobias Deigendesch, Backnang (DE); Florian Hoche, Besigheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 14/445,372

(22) Filed: Jul. 29, 2014

(65) Prior Publication Data
US 2015/0038064 A1    Feb. 5, 2015

(30) Foreign Application Priority Data

Jul. 31, 2013 (DE) .......................... 10 2013 012 746

(51) Int. Cl.
| | |
|---|---|
| B23D 45/16 | (2006.01) |
| B25F 5/02 | (2006.01) |
| B24B 27/08 | (2006.01) |
| B24B 55/02 | (2006.01) |
| B25B 23/02 | (2006.01) |
| B24B 27/06 | (2006.01) |

(52) U.S. Cl.
CPC ............... *B23D 45/16* (2013.01); *B24B 27/06* (2013.01); *B24B 27/08* (2013.01); *B24B 55/02* (2013.01); *B25B 23/02* (2013.01); *B25F 5/02* (2013.01)

(58) Field of Classification Search
CPC ........ B24B 23/02; B24B 45/16; B24B 27/06; B24B 27/08; B24B 55/02; B25F 5/02
See application file for complete search history.

(56) References Cited

U.S. PATENT DOCUMENTS

| | | | | |
|---|---|---|---|---|
| 3,583,106 | A * | 6/1971 | Dobbertin | B24B 27/08 30/122 |
| 5,709,594 | A | 1/1998 | Körner et al. | |
| 5,826,478 | A * | 10/1998 | Zerrer | B05B 15/061 239/600 |
| 6,374,501 | B1 | 4/2002 | Claesson | |
| 2007/0056575 | A1 | 3/2007 | Machens et al. | |
| 2007/0240313 | A1* | 10/2007 | Layher | B23D 59/02 30/123.3 |
| 2007/0261254 | A1* | 11/2007 | Donnerdal | B23D 45/16 30/389 |
| 2009/0019710 | A1* | 1/2009 | Grossman | B01D 46/0075 30/390 |
| 2009/0283286 | A1* | 11/2009 | Hoffmann | B23D 47/12 173/215 |
| 2010/0132656 | A1 | 6/2010 | Doering et al. | |
| 2013/0180116 | A1* | 7/2013 | Yokoyama | B23D 45/16 30/275.4 |
| 2013/0340693 | A1* | 12/2013 | Schaffer | F01P 1/06 123/41.65 |
| 2014/0024298 | A1 | 1/2014 | Scholz | |
| 2015/0004885 | A1* | 1/2015 | Scholz | B24B 27/08 451/358 |

FOREIGN PATENT DOCUMENTS

DE    34 44 116    6/1986

* cited by examiner

*Primary Examiner* — Dung Van Nguyen
(74) *Attorney, Agent, or Firm* — Gudrun E. Huckett

(57) ABSTRACT

A hand-guided power tool has a support arm and a tool member supported on the support arm. A drive motor is provided and a drive belt is rotatably driven by the drive motor and drives in turn the tool member. The support arm has a belt chamber in which the drive belt is arranged. The belt chamber is closed off relative to the environment and sealed off relative to the environment.

14 Claims, 10 Drawing Sheets

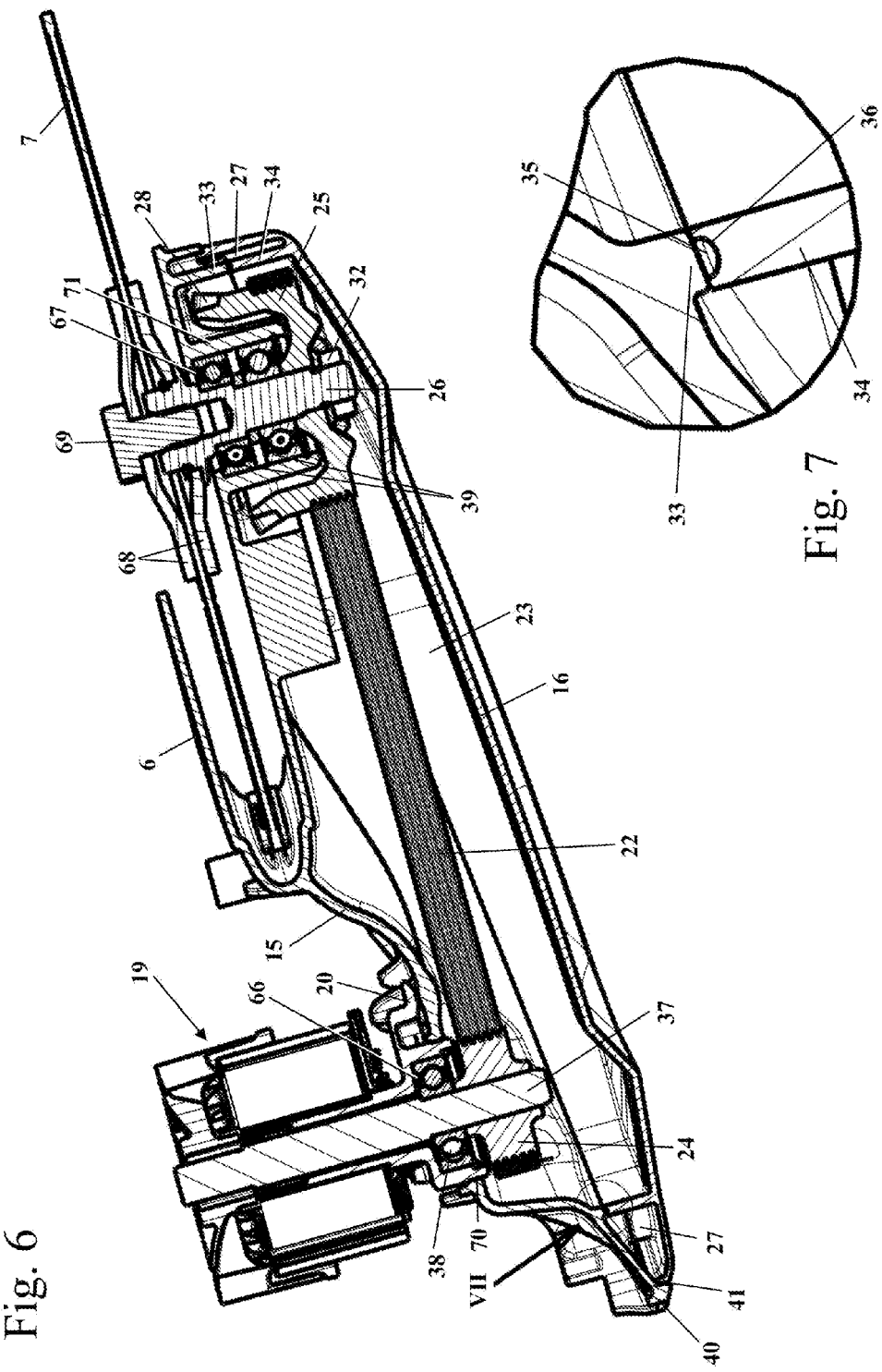

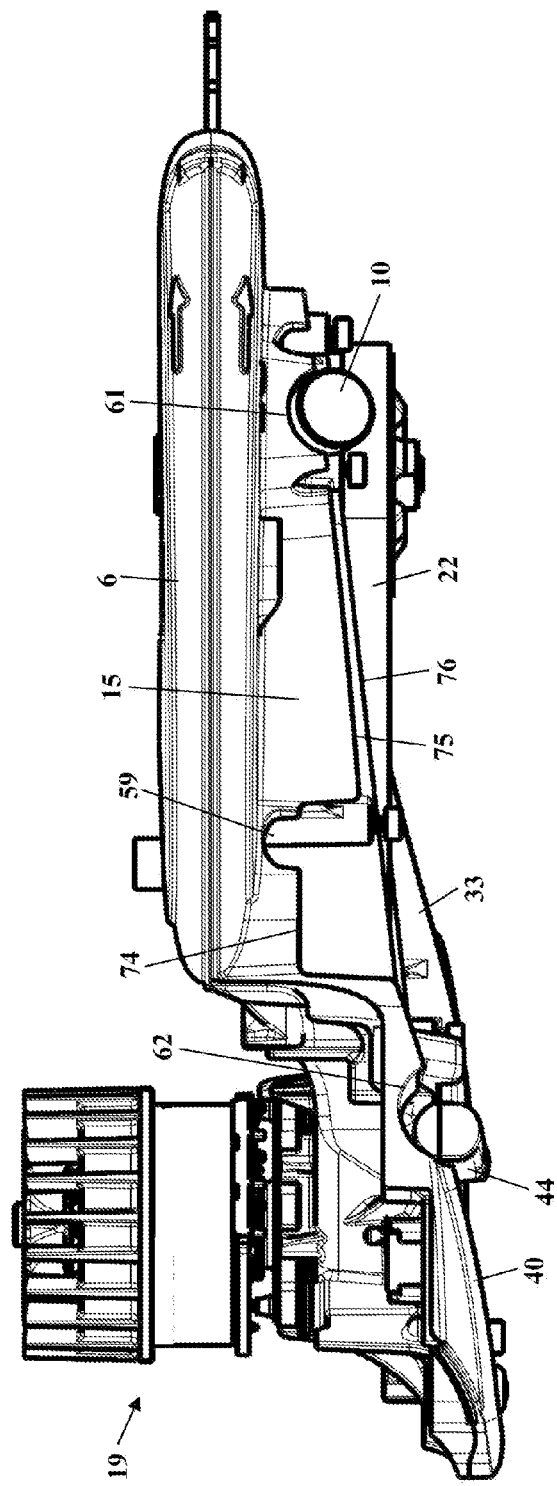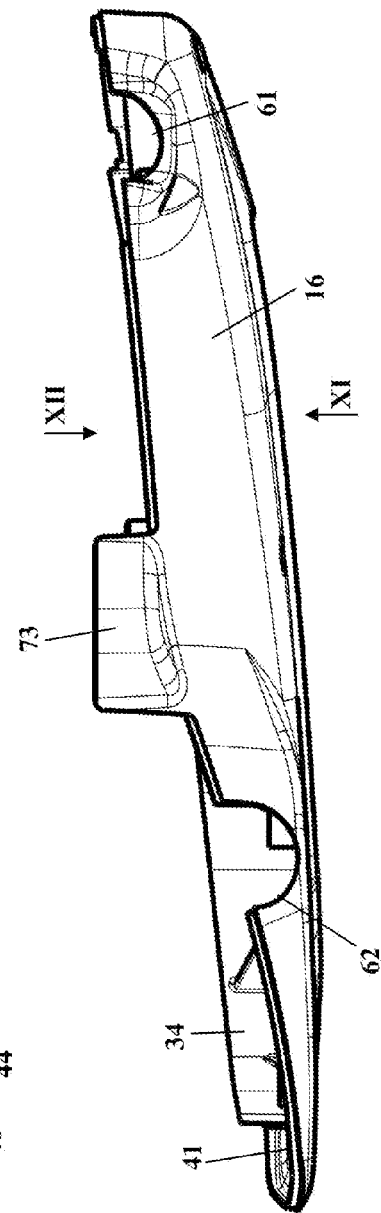

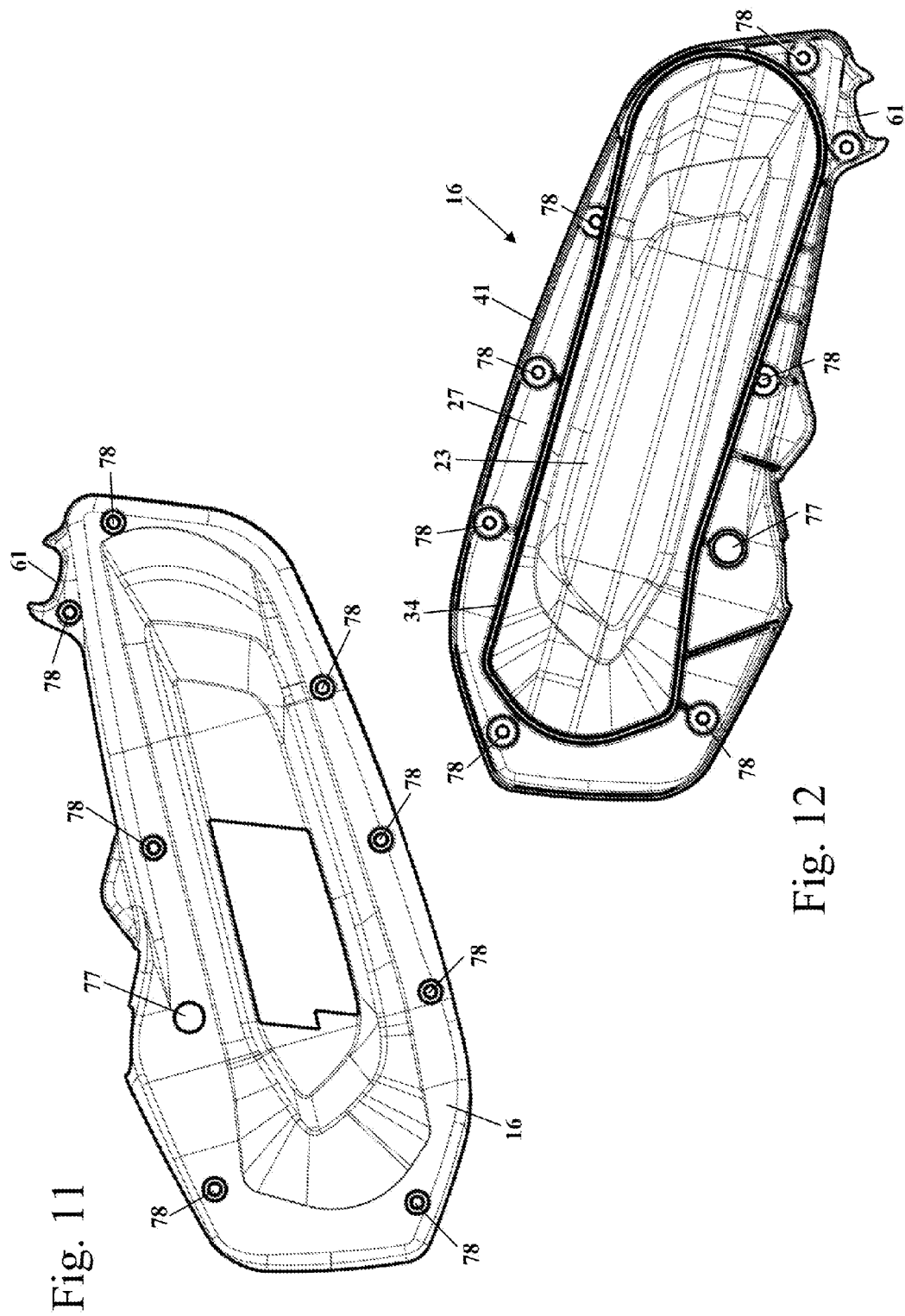

HAND-GUIDED POWER TOOL

BACKGROUND OF THE INVENTION

The invention relates to a hand-guided power tool comprising a tool member that is supported on a support arm and further comprising a drive motor. The tool member is driven in rotation by the drive motor by means of at least one drive belt. The drive belt is arranged in a belt chamber that is formed within the support arm.

U.S. Pat. No. 5,709,594 discloses a hand-held power tool, i.e., a cut-off machine having a cutting wheel that is supported on a support arm. The cutting wheel is driven in rotation by means of a drive belt. A tensioning device is acting on the drive belt.

SUMMARY OF THE INVENTION

It is an object of the present invention to provide a hand-guided power tool of the aforementioned kind that has a simple and robust configuration and a long service life.

In accordance with the present invention, this is achieved in that the belt chamber is closed off and sealed off relative to the environment.

It has been found that soiling caused in operation by workpiece swarf and by liquid supplied in operation to the tool member may reduced the service life of the drive belt. It is provided according to the invention that the belt chamber is closed off and sealed off relative to the environment. Sealing the belt chamber relative to the environment prevents that dirt and moisture can reach the drive belt. Accordingly, the service life of the drive belt can be increased in this way so that an exchange of the drive belt during the service life of the power tool is not required. Since no replacement of the drive belt by the user is required, a tensioning device that enables exchange/replacement of the drive belt is not needed and can be dispensed with. The configuration of the power tool is thereby simplified.

A closed-off and sealed-off belt chamber is in particular expedient when the drive belt is an elastic belt and no tensioning device is required for maintaining the drive belt tension in operation. The elastic drive belts have such a high inherent elasticity that they require no tensioning device. When an elastic drive belt is used, a belt tensioning device for the drive belt can be dispensed with; thus, the configuration of the power tool is simplified.

Advantageously, the support arm is formed by a support arm component and a cover wherein the support arm component and the cover delimit the belt chamber. The support arm may comprise further components in addition to the support arm component and the cover. A simple configuration results when between the support arm component and the cover a circumferentially extending receptacle is formed in which a seal is arranged. The seal is advantageously a cured liquid seal which is introduced in the liquid state into the receptacle and cures after joining of the cover and the support arm component. Preferably, the support arm component and the cover each have a sealing rim which projects toward the other component, respectively. The receptacle can be formed on the sealing rim of the support arm component, the sealing rim of the cover, or on the sealing rim of the support arm component and the sealing rim of the cover. Since opening of the belt chamber by the operator is not required and therefore not provided for, a seal can be used which is destroyed when the belt chamber is opened. In this way, a simple configuration and a reliable sealing action are provided.

Advantageously, the support arm component and the cover delimit an exterior chamber which is located outside of the belt chamber and which at least partially surrounds the belt chamber in the area of the seal. The exterior chamber surrounds the belt chamber at least at the seal. The exterior chamber protects the seal relative to the environment. Preferably, the exterior chamber is of a substantially closed-off configuration relative to the environment. The belt chamber forms thus an inner sealing space and the exterior chamber forms an outer seating space that, relative to the environment, is sealed less tightly than the inner sealing space. The outer sealing space prevents preferably that jets of water or the like can reach the seal. At the same time, strong soiling of the area of the seal is prevented by the exterior chamber. Preferably, the exterior chamber completely surrounds the belt chamber at the seal.

Advantageously, the exterior chamber has at least one opening that is communicating with the environment and is at least partially closed by a component that projects through the opening into the exterior chamber. Preferably, the opening is substantially completely closed off by the component. Advantageously, the support arm component has a rim which is resting at least across a portion of its length on a rim of the cover. The exterior chamber is preferably arranged between the belt chamber and the rims of the support arm component and of the cover. In this way, a simple configuration is achieved. No additional components are required for the exterior chamber. The cover is advantageously secured on the support arm component by means of a fastening element that extends through the exterior chamber. Since the fastening element extends through the exterior chamber but not through the belt chamber, an additional sealing action must not be provided. Since the fastening element extends through the exterior chamber but not through an area which is arranged outside of the exterior chamber, a compact configuration can be realized. Preferably, all of the fastening elements for the cover extend through the exterior chamber.

The power tool has preferably a water supply line for supply of water to the tool member. At least one section of the water supply line is advantageously passed through the exterior chamber. In this way, a compact configuration is provided. The water supply line can also form a component that closes off at least partially an opening provided at the exterior chamber and communicating with the environment. Since the water supply line is at least partially extending through the exterior chamber, a pleasing outer appearance of the power tool can be achieved. At the same time, the position of the water supply line is secured as a result of being arranged in the exterior chamber and no additional fastening devices for this section of the water supply line are required.

Advantageously, the power tool has a guard for the tool member that partially covers the tool member. A simple configuration results when the guard is monolithically formed together with the support arm component. Fastening elements for the guard can thus be dispensed with. A particularly advantageous configuration results when a wall of the support arm component delimits the belt chamber and at the same time forms a section of the guard. In this way, doubled walls are avoided and the total weight of the power tool can be lowered. The support arm component is preferably designed as a supporting housing component. Preferably, the support arm component is made of metal, in particular of a light metal. A beneficial force introduction can be achieved when the power tool has a front handle that is a bow-shaped handle, wherein at least one end of the front handle is provided on the support arm component. In this way, a large proportion of the forces acting on the power tool can be introduced immediately into the support arm component. Preferably, both ends of the bow-shaped handle are secured on the support arm component. Further housing components can be designed with reduced strength and, for example, can be comprised of plastic material so that as a whole a reduced total weight of the power tool results. The configuration of the support arm component as a supporting housing component constitutes its own inventive concept, independent of the sealing action of the belt chamber relative to the environment.

Advantageously, the power tool has a locking device for the tool member. The locking device for the tool member is in particular provided for tool member exchange for releasing a fastening nut of the tool member. The locking device has advantageously a locking bolt which is projecting through a wall of the belt chamber and is supported to be longitudinally slidable. Advantageously, the locking bolt is sealed relative to the wall of the belt chamber. The sealing action can be an immediate sealing action relative to the wall of the belt chamber or can be realized indirectly through further components that are connected seal-tightly with the wall of the belt chamber. Accordingly, the belt chamber, despite the moveable locking bolt that is projecting into the belt chamber, can be configured to be sealed off relative to the environment.

Advantageously, the drive motor of the power tool is secured on the support arm component. The support arm component forms in this way a supporting housing component for the drive motor. The drive motor is preferably an electric motor, in particular an electric motor that is supplied with energy from a rechargeable battery pack. The electric motor can however also be supplied with energy by means of an electric power cord. It may also be provided that the drive motor is an internal combustion engine, in particular a single cylinder combustion engine, preferably a two-stroke engine or a mixture-lubricated four-stroke engine. It is particularly advantageous when the drive motor as well as the guard and the bow-shaped handle are secured on the support arm component. With this design, an advantageous configuration and an excellent force introduction into the support arm component are provided. The forces acting on the power tool are mainly introduced into the support arm component that forms a support structure of the power tool.

In particular, at least one fastening element that secures the drive motor on the support arm component projects into the belt chamber. The fastening element is advantageously arranged seal-tightly in the belt chamber so that the belt chamber is completely closed off and sealed off relative to the environment. The drive belt is advantageously guided across a drive pulley that is fixedly secured on a drive shaft of the drive motor and an output pulley that is fixedly secured to an output shaft. The drive shaft and the output shaft project advantageously through a wall of the belt chamber. The belt chamber is advantageously sealed at the drive shaft by means of at least one bearing of the drive shaft and is sealed at the output shaft by means of at least one bearing of the output shaft. In this way, penetration of dirt or moisture into the belt chamber at the drive shaft and at the output shaft can also be reliably prevented. Since the seals of the bearings are used in order to seal the belt chamber relative to the environment, separate seals are not required. In this way, a simple configuration results. Preferably, the drive belt is an elastic drive belt. The spacing of the drive pulley to the output pulley is advantageously fixed and unchangeable. A tensioning device that changes the spacing of the drive pulley relative to the output pulley is advantageously not provided. Accordingly, a simple configuration is achieved. The output pulley and the drive pulley are advantageously supported fixedly on the output shaft and the drive shaft, respectively. When using an elastic drive belt, a tensioning device for the drive belt can be dispensed with so that a simple configuration results.

BRIEF DESCRIPTION OF THE DRAWING

FIG. 6 is a section along the section line VI-VI of FIG. 5.
FIG. 7 is a detail VII of FIG. 6 in an enlarged illustration.
FIG. 9 is a view from above in the direction of arrow IX of FIG. 8.
FIG. 10 is a view from above onto the cover.
FIG. 11 is a side view of the cover in the direction of arrow XI in FIG. 10.
FIG. 12 is a side view of the cover in the direction of arrow XII in FIG. 10.

DESCRIPTION OF THE PREFERRED EMBODIMENTS

Figure 1:
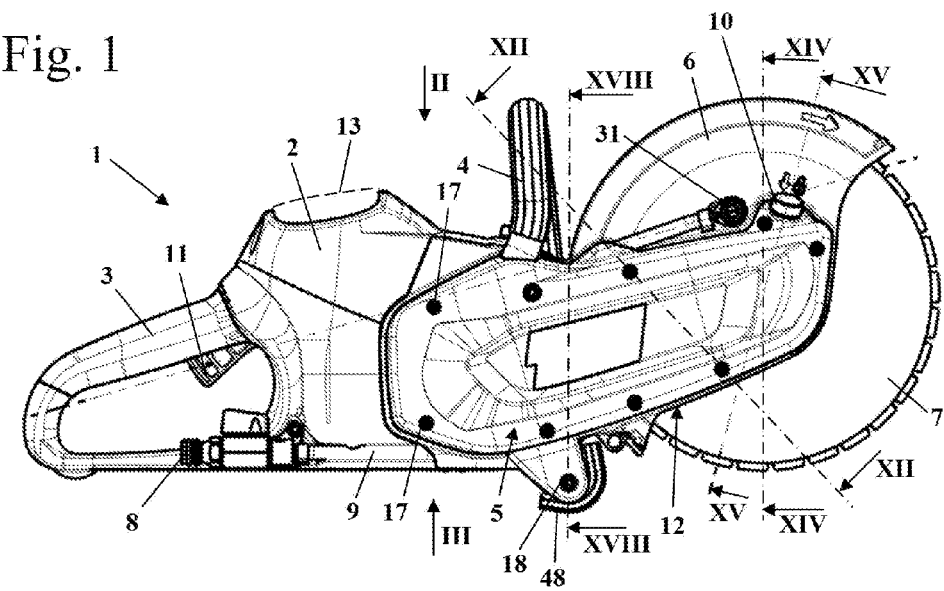
FIG. 1 is a side view of a cut-off machine.

FIG. 1 shows a cut-off machine 1 as an embodiment of a hand-held power tool. The cut-off machine 1 has a housing 2 on which a handle 3 is secured. In this embodiment, the handle 3 is a rear handle. The cut-off machine 1 has also a front handle in the form of bow-shaped handle 4 which at least partially surrounds the housing 2. On the housing 2, a support arm 5 is arranged which projects forwardly from the end of the housing 2 facing away from the rear handle 3. On the support arm 5, a guard 6 is secured which partially covers the tool member of the cut-off machine 1, i.e., a cutting wheel 7. On the support arm 5, a locking device 10 is arranged which is positioned in the area of the end of the support arm 5 facing away from the housing 2; its function will be explained in more detail in the following. It is also shown in FIG. 1 that on the guard 6 a drain edge 12 is arranged that serves to drain liquid in operation in downward direction to the ground. The drain edge 12 is arranged at the longitudinal side of the guard 6 that faces the support arm 5 and is located at the bottom in the position of use of the cut-off machine 1.

The cut-off machine 1 has a water connector 8 which by means of a water supply line 9 is connected to the connecting element 31 mounted on the guard 6. A water feed conduit can be connected to the water connector 8 for establishing a connection to a water tank or to an external water supply. Via the connecting element 31, water for cooling the cutting wheel 7 and for binding material that has been cut by the cutting wheel 7 is guided into the interior of the guard 6. The dust produced during cutting drops together with the water as sludge onto the drain edge 12 in downward direction. The drain edge 12 is arranged adjacent to the cutting wheel 7 and extends parallel to the cutting wheel 7, as illustrated in FIG. 1.

In the housing 2, a rechargeable battery pack 13 is provided for supplying energy to the drive motor, not shown in FIG. 1. In this embodiment, the rechargeable battery pack 13 is inserted into a compartment provided in the housing 2. The drive motor can however also be connected by an electric power cord to an energy supply. At the rear handle 3, an operating lever 11 for operating the drive motor is pivotably supported.

Figure 2:
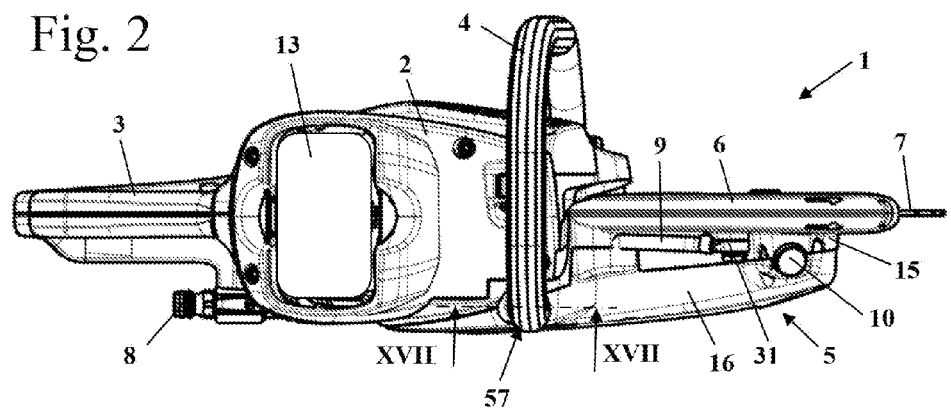
FIG. 2 is a plan view in the direction of arrow II of FIG. 1.
Figure 3:
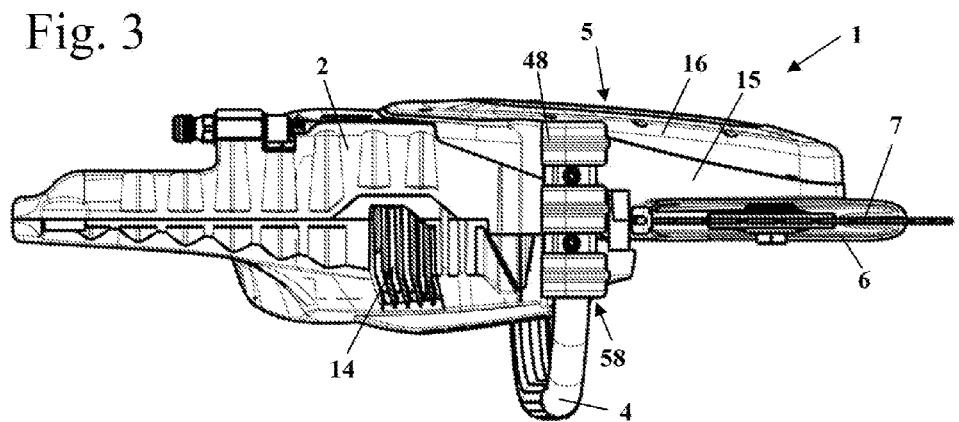
FIG. 3 is a view from below in the direction of arrow III in FIG. 1.

As shown in FIGS. 2 and 3, the support arm 5 is comprised of a support arm component 15 and a cover 16. The cover 16 is secured by means of fastening screws 17, illustrated in FIG. 1, on the support arm component 15. For fixation of a lower end of the bow-shaped handle 4, a fastening screw 18 is provided which will be described in more detail in the following. As shown in particular in FIG. 2, the guard 6 is formed integrally with the support arm component 15, i.e., is unitary or monolithic therewith. The support arm component 15 is advantageously produced by a casting process from metal, in particular light metal such as magnesium or aluminum. As shown in FIG. 2, a first end 57 of the bow-shaped handle 4 is secured on the support arm 5, in particular on the topside of the support arm 5. FIG. 3 shows the second end 58 of the bow-shaped handle 4 which is extending on the bottom side of the housing 2 and is secured by means of the fastening screw 18 on the support arm 5. The second end 58 of the bow-shaped handle 4 is covered by a cover 48, shown in FIGS. 1 and 3; the cover 48 serves at the same time as a support leg for the cut-off machine 1. As shown in FIG. 3, the housing 2, at the side that is downwardly facing in the generally employed position of use, has a cooling air outlet opening 14 across which several ribs are extending.

Figure 4:
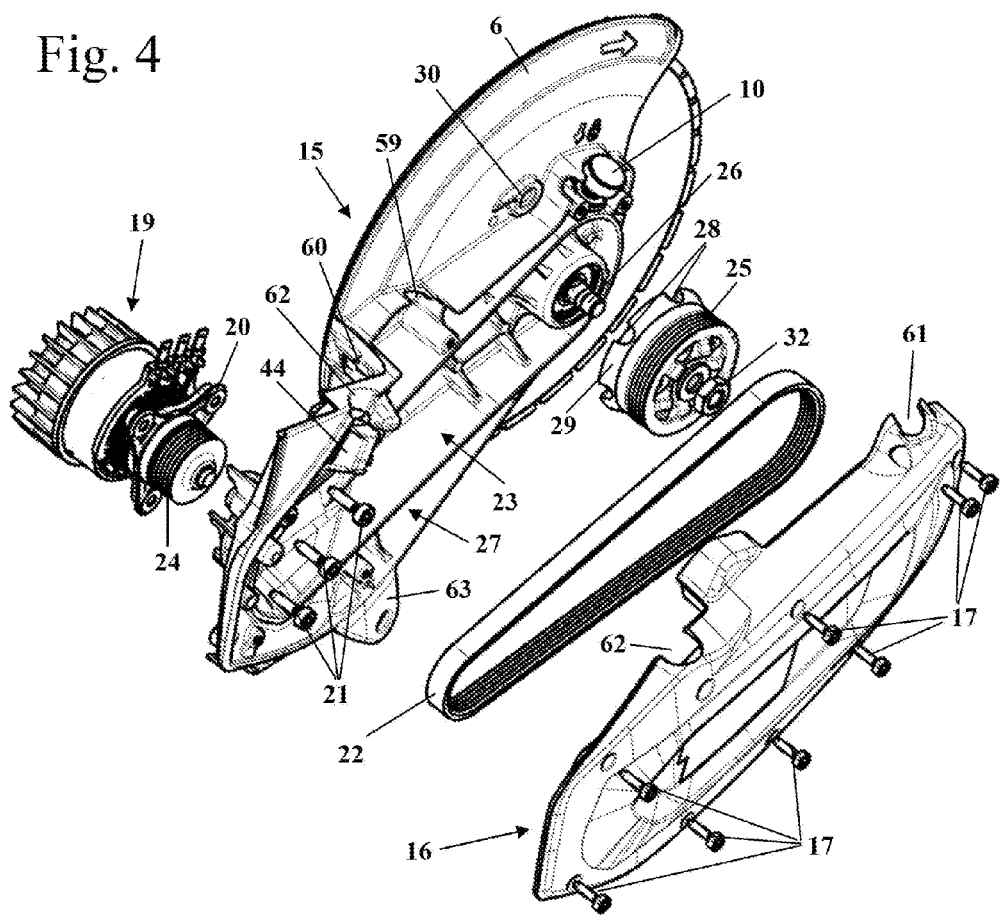
FIG. 4 is an exploded view of the support arm of the cut-off machine of FIG. 1.

FIG. 4 shows the configuration of the support arm 5 in detail. On the support arm 5, in particular on the support arm component 15, the drive motor 19 is secured. The drive motor 19 has a fastening flange 20 which in the illustrated embodiment is secured by three fastening screws 21 on the support arm component 15. The drive motor 19 drives with its drive shaft a drive pulley 24 which is designed as a cup-shaped belt pulley. On the outer circumference of the drive pulley 24 the drive belt 22 is guided. The drive belt 22 is guided across an output pulley 25 which in this embodiment is also designed as a cup-shaped belt pulley. By means of the drive belt 22, the output pulley 25 is driven in rotation by the drive pulley 24. The output pulley 25 is fixedly secured on an output shaft 26. In axial direction, the output pulley 25 is secured on the output shaft 26 by means of a fastening nut 32. The drive belt 22 is an elastic drive belt. The elastic drive belt has such a high elasticity and inherent tension that a tensioning device for the elastic drive belt is not required.

Figure 16:
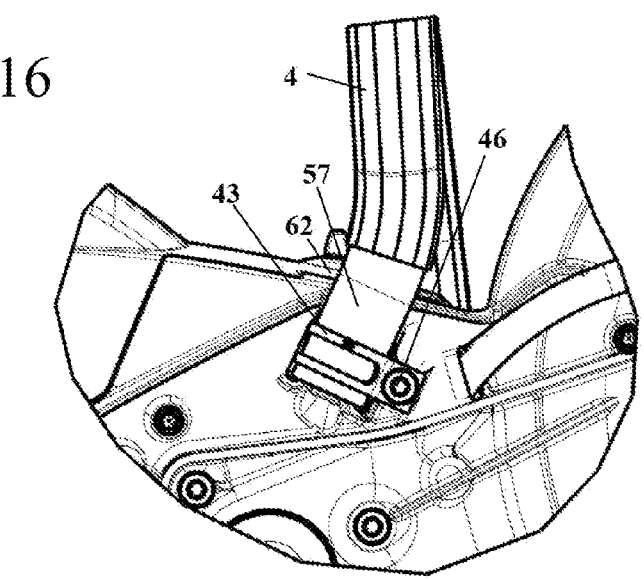
FIG. 16 is a side view of the support arm component with bow-shaped handle arranged thereat.
Figure 17:
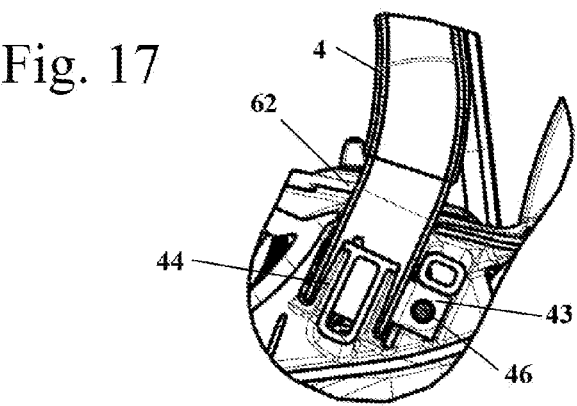
FIG. 17 is a section along the section line XVII-XVII of FIG. 2.

The drive belt 22, together with the drive pulley 24 and the output pulley 25, is arranged in a belt chamber 23 which is delimited by the support arm component 15 and the cover 16. The belt chamber 23 is surrounded by an exterior chamber 27. The belt chamber 23 is sealed relative to the environment to be dust-tight, moisture-tight, and seal-tight with regard to splashing water and jets of water. The exterior chamber 27 is only partially sealed off and has openings 59, 60, 61, and 62 that communicate with the environment. Through the openings 59 and 60 the water supply line 9 is extending, as schematically shown in dashed lines in FIG. 8. Through the opening 61, the locking device 10 is projecting. Through the opening 62, the bow-shaped handle 4 is extending, as shown in FIG. 17. As also shown in FIG. 4, a socket 44 projects into the opening 62 onto which the bow-shaped handle 4 is pushed, as shown in FIGS. 16 and 17. The water supply line 9, the handle 4, and the locking device 10 close off the openings 59 to 62 at least partially. In the shown embodiment, the openings 59 to 61 are mostly closed off. Accordingly, through the openings 59 to 61 only small quantities of dust or moisture can penetrate into the exterior chamber 27. Penetration of a water jet is substantially prevented. The exterior chamber 27 forms an outer sealing space that, relative to the environment, is substantially of a closed-off configuration and that surrounds the belt chamber 23. The belt chamber 23 forms an inner chamber that is sealed off and closed off completely relative to the environment. The exterior chamber 27 protects the belt chamber 23 from jets of water and from becoming strongly soiled.

The fastening screws 17 with which the cover 16 is secured on the support arm component 15 project through the exterior chamber 27. In the embodiment, the fastening screws 17 are screwed into support sleeves which are arranged in the exterior chamber 27. The output pulley 25 has recesses 28 which are formed in the rim 29 of the output pulley 25. The recesses 28 are engaged by the locking device 10 for temporary anti-rotation fixation of the output pulley 25 and thus of the output shaft 26. The locking device 10 serves to temporarily secure the drive shaft 26 against rotation when exchanging the cutting wheel 7. The guard 6 has an opening 30 for supply of water into the interior of the guard 6.

Figure 5:
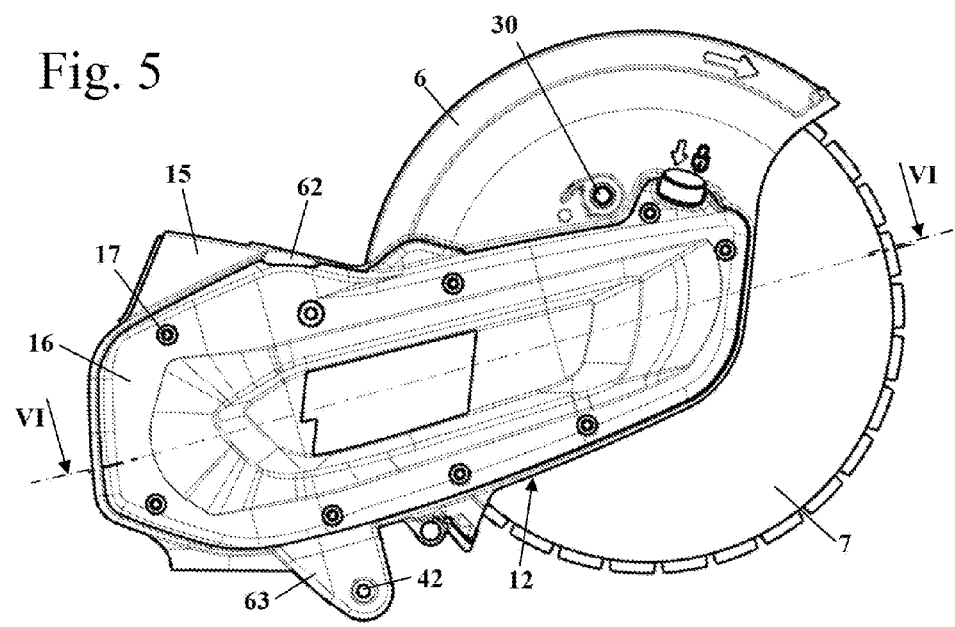
FIG. 5 is a side view of the support arm.

As shown in FIGS. 4 and 5, the support arm component 15 has an extension 63 that has an opening 42 for the fastening screw 18, shown in FIG. 1, for the handle 4. FIG. 5 also shows how the drain edge 12 at the guard 6 is extending.

FIG. 6 shows the configuration of the drive of the cutting wheel 7 in detail. The drive motor 19 has a drive shaft 37 which is rotatably supported with a bearing 38 at the support arm component 15. The bearing 38 is arranged in the fastening flange 28 and has a seal 66. By means of the seal 66 of the bearing 38 the belt chamber 23 is sealed at the bearing 38 relative to the environment. The fastening flange 20 of the drive motor 19 is arranged in an opening 70. The fastening flange 20 is preferably pressed into the opening 70. The fastening flange 20 and the support arm component 15 are comprised advantageously of metal. The components of metal that are abutting each other do not form an air-tight connection so that pressure compensation between the belt chamber 23 and the environment is possible between fastening flange 20 and opening 70.

As shown in FIG. 6, the support arm 5 has a cup-shaped receptacle 71 in which two bearings 39 for the output shaft 26 are arranged. In this embodiment, the bearings 38 and 39 are formed as ball bearings. Other bearings, preferably roller bearings, can also be advantageously used, however. The bearing 39 which is arranged adjacent to the cutting wheel 7 has a seal 67 with which the belt chamber 23 is sealed at the output shaft 26 relative to the environment. The cutting wheel 7 is secured between two clamping discs 68 and is secured on the output shaft 26 by means of a screw 69. As also shown in FIG. 6, a portion of the guard 6 delimits the belt chamber 23. Accordingly, since the guard 6 itself delimits the belt chamber 23, doubled walls are avoided and due to the monolithic embodiment of the guard 6 as an integral part of the support arm component 15, the total weight of the cut-off machine 1 can be reduced.

As also shown in FIG. 6, the support arm component 15 has a sealing rim 33 which is designed as a circumferentially extending rim. The cover 16 has a sealing rim 34 which is also circumferentially extending and is resting with its end face on the sealing rim 33. As shown in the enlarged illustration of FIG. 7, between the sealing rims 33 and 34 a seal 35 is arranged which seals the belt chamber 23 relative to the environment. In the embodiment, the sealing rim 34 of the cover 16 has a receptacle 36 for the seal 35; the receptacle 36 is configured as a groove. The receptacle 36 can however also be formed in the sealing rim 33. It may also be provided that a receptacle for the seal 35 is provided in the sealing rim 33 as well as in the sealing rim 34. The seal 35 is preferably a cured liquid seal. In this way, a great seal-tightness can be achieved in a simple way. Since the drive belt 22 is designed as an elastic belt and must not be exchanged, it is not required that the cover 16 be detachable from the support arm component 15 such that the seal 35 is not destroyed. FIG. 6 also shows that the exterior chamber 27 surrounds the belt chamber 23 in the area of the sealing rims 33, 34. Accordingly, the seal 35 at the side facing away from the belt chamber 23 is surrounded at any position by the exterior chamber 27 and in this way is protected from environmental effects. The support arm component 15 has a rim 40 which is adjacent to a rim 41 of the cover 16. The rims 40 and 41, as shown in FIG. 6, can be arranged in an overlapped arrangement in order to seal in this way the exterior chamber 27 like a labyrinth seal. The seal of the exterior chamber 27 must not be completely dust-tight or liquid-tight. Due to the exterior chamber 27, the seal 35 is however protected from being soiled and from jets of water.

Figure 8:
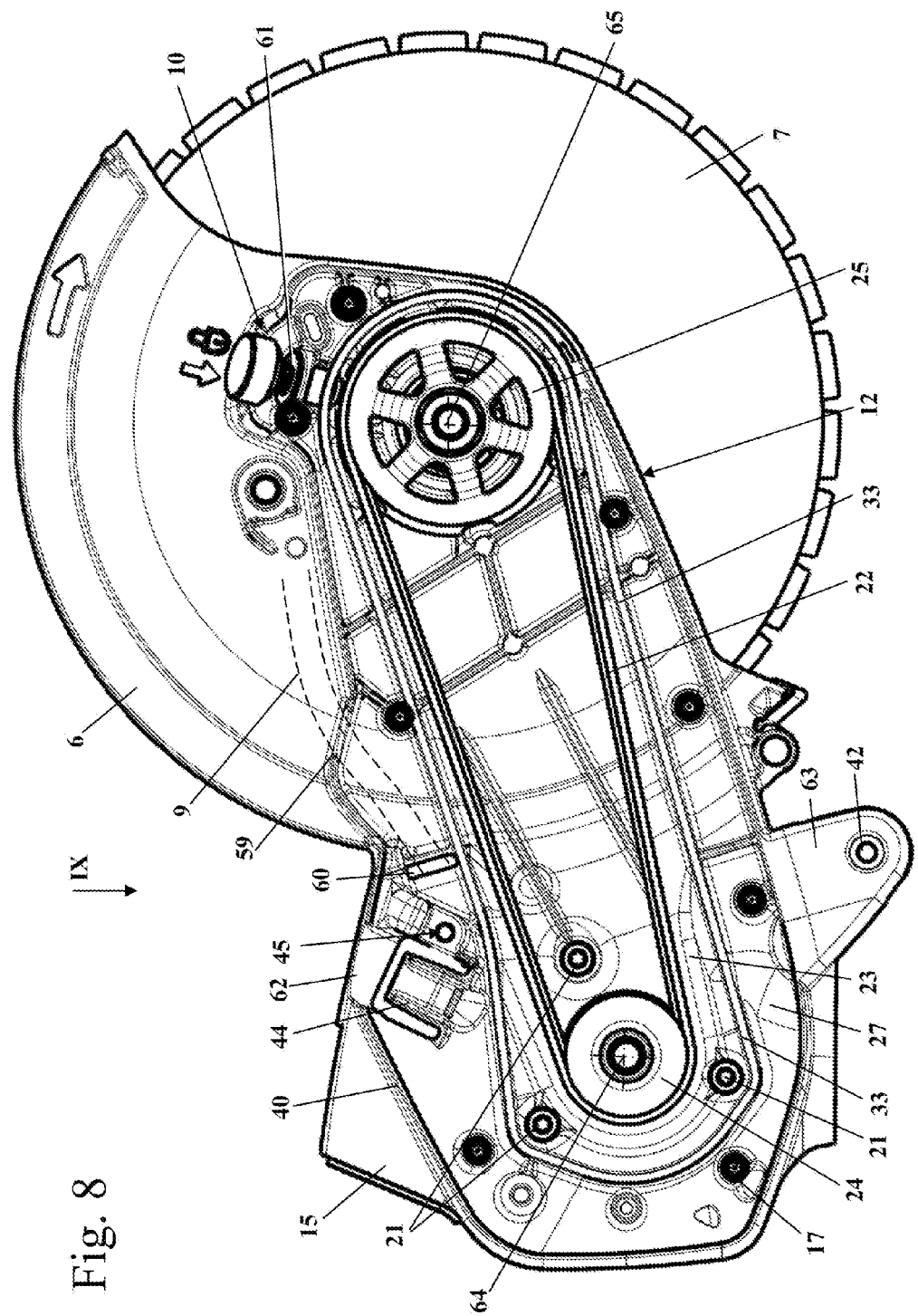
FIG. 8 is a side view of the support arm with cover removed.

As shown in FIG. 8, the exterior chamber 27 surrounds completely the belt chamber 23. The fastening screws 17 for the cover 16 project through the exterior chamber 27. The fastening screws 21 for the fastening flange 20 of the drive motor project into the belt chamber 23. The drive pulley 24 is rotatably supported about axis of rotation 64 and the output pulley 25 about axis of rotation 65. The spacing of the axes of rotation 64 and 65 relative to each other is fixed and cannot be changed. In order to mount the drive belt 22, advantageously a special tool is provided.

In FIG. 8, the socket 44 projecting into the opening 62 can also be seen well. Adjacent to the socket 44, the support arm component 15 has an opening 45 which can be designed as a threaded bore. As shown in FIG. 16, the first end 57 of the bow-shaped handle 4 is arranged on the socket 44 such that the socket 44 projects into the interior of the handle 4. The handle 4 projects through opening 62. On the outer circumference of the handle 4, a fastening clamp 43 (FIG. 16) is arranged that is secured by means of clamping screw 46. The clamping screw 46 is screwed into the opening 45 (FIG. 8). By means of the fastening clamp 43 the handle 4 is secured on the socket 44. FIG. 17 shows the arrangement of the handle 4 on the outer circumference of the socket 44. The clamping screw 46 is illustrated in section view.

As shown in FIGS. 9 and 10, the openings 61 and 62 are delimited by the support arm component 15 as well as by the cover 16. The opening 59 is designed as a cutout on the support arm component 15 and is delimited by a section 73 of the cover 16 which projects into an appropriately designed recess 74 on the rim 40 of the support arm component 15. Accordingly, the opening 59 can be arranged immediately adjacent to the guard 6 at a spacing to an end face 75 of the rim 40. As illustrated in FIGS. 9 and 10, the end face 75 of the rim 40, like the end face 76 of the sealing rim 33, extends at a slant relative to the longitudinal direction of the drive belt 22.

FIGS. 11 and 12 show the cover 16. The cover 16 has eight openings 78 through which the fastening screws 17 project. The cover 16 has also an opening 77 which is arranged in the area of the clamping screw 46 (FIG. 16) so that the clamping screw 46 is accessible from the exterior and, as needed, can be tightened by the operator. As shown in FIG. 12, the sealing rim 34 is completely arranged within the rim 41. The exterior chamber 27 therefore surrounds the belt chamber 23 completely. The belt chamber 23 in this embodiment is very narrow in the area of the leading free end of the support arm 5 (FIG. 1). All openings 78 and the opening 77 open into the exterior chamber 27. The openings 77 and 78 do not impair therefore the seal-tightness of the belt chamber 23.

Figure 13:
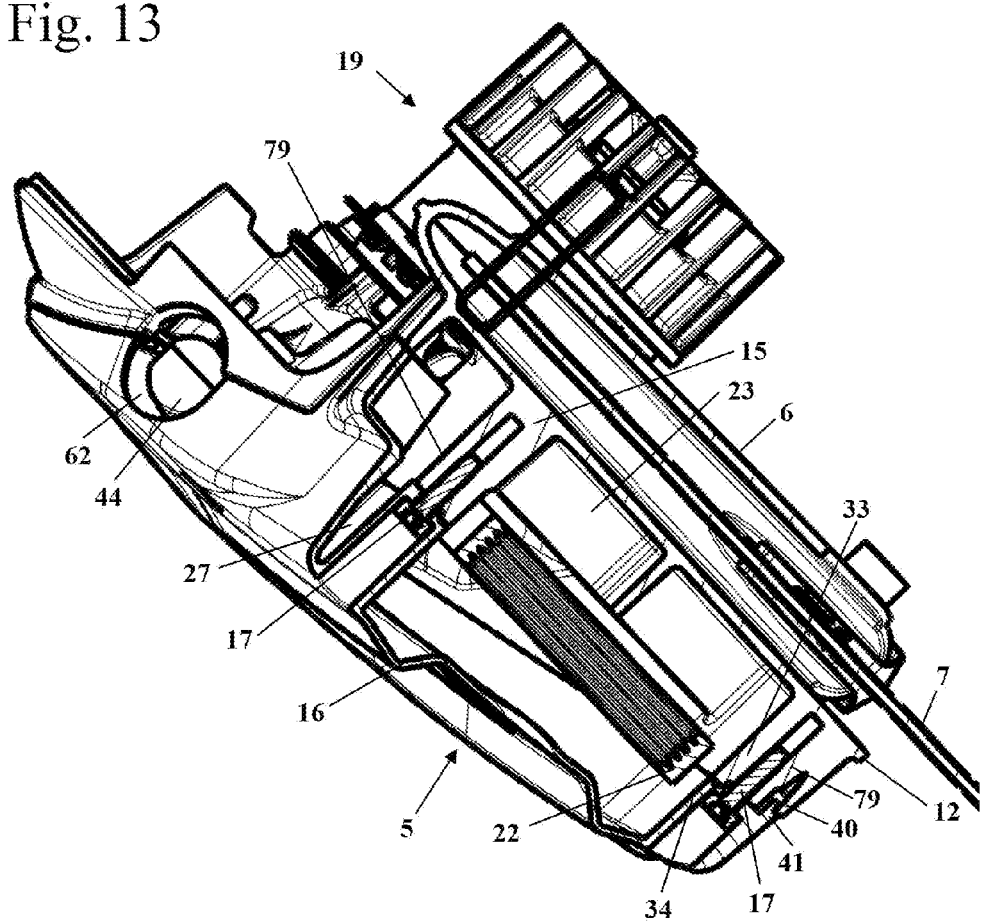
FIG. 13 is a section view along the section line XIII-XIII of FIG. 1.

FIG. 13 shows the arrangement of two fastening screws 17. The fastening screws 17 are screwed in from the exterior side of the cover 16 into a support sleeve 79 of the support arm component 15; the support sleeve 79 extends into the exterior chamber 27. In the section plane illustrated in FIG. 13, the two support sleeves 79 are positioned immediately adjacent to the sealing rim 33. The support sleeves 79 extend outside of the seal 35 (FIG. 7) in the exterior chamber 27.

In FIG. 13, the drain edge 12 is shown in section. The drain edge 12 is designed as a raised portion on the support arm 5. Accordingly, the drain edge 12 forms a wear protection for the support arm 5. In case of a deep cut, the edge 12 forms a stop which avoids contact of the support arm 5 with the workpiece.

Figure 14:
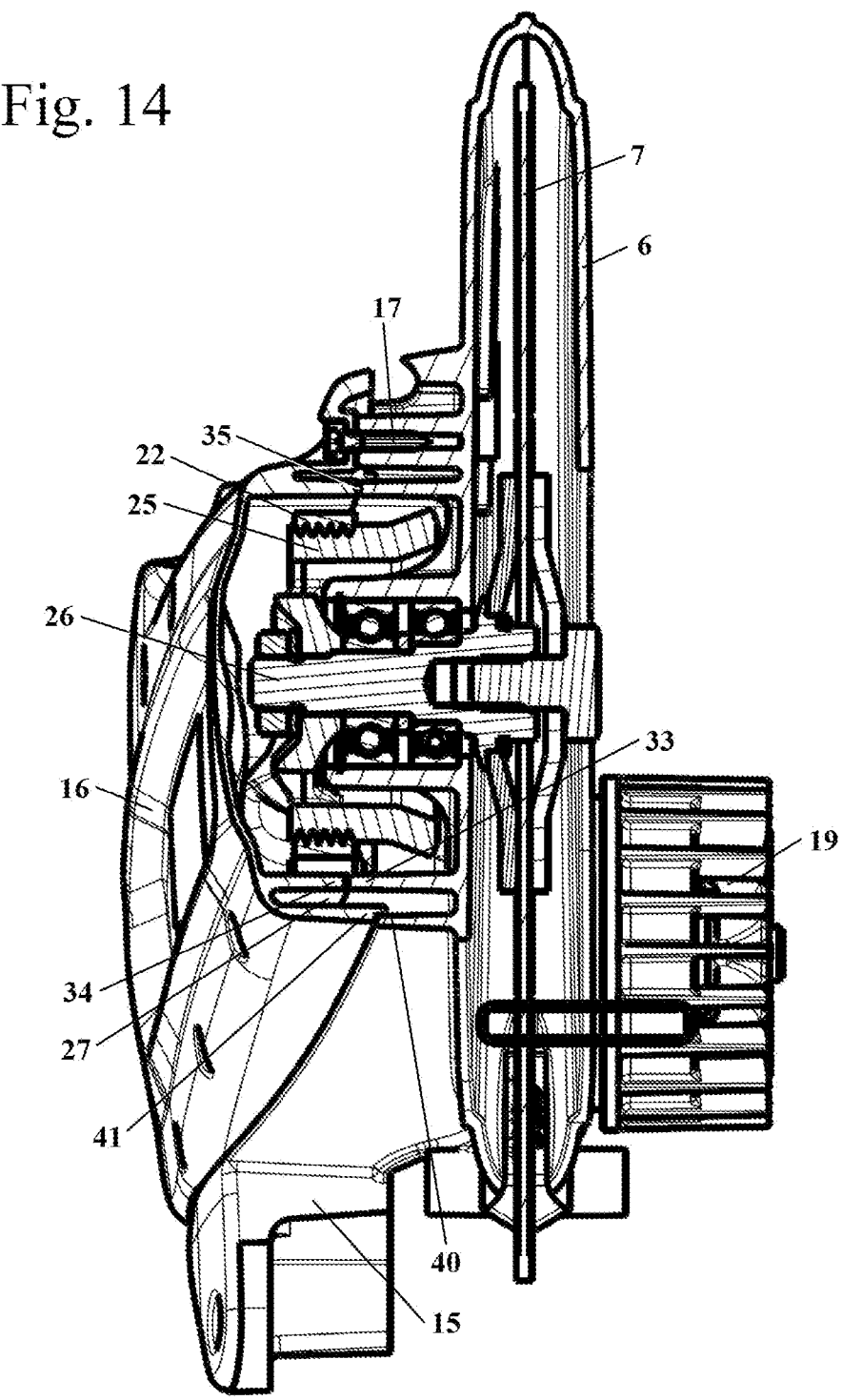
FIG. 14 is a section view along the section line XIV-XIV of FIG. 1.

FIG. 14 shows the configuration of the belt chamber 23 and the exterior chamber 27 in the area of the output pulley 25. The fastening screw 17 which is arranged in this area projects through the exterior chamber 27 and is sealed relative to the belt chamber 23 by the seal 35. As also shown in FIG. 14, the rims 41 and 40 of cover 16 and support arm component 15 are overlapping such that an excellent protection of the seal 35 relative to splashing water and soiling is provided by means of the exterior chamber 27.

Figure 15:
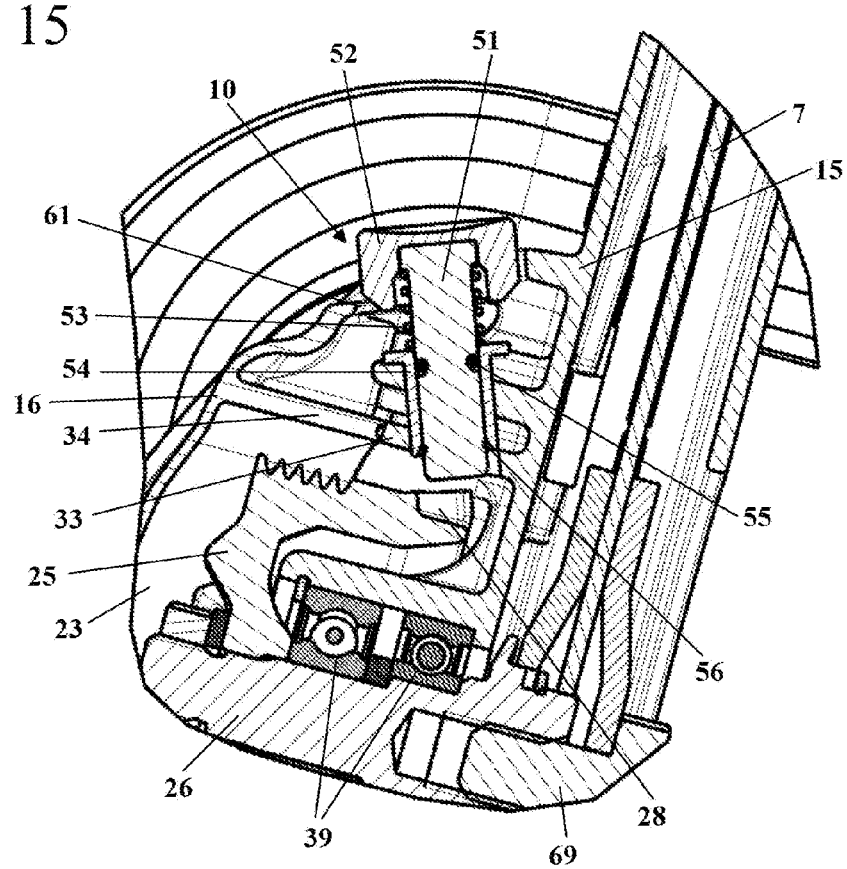
FIG. 15 is a detail section illustration along the section line XV-XV of FIG. 1.

FIG. 15 shows the locking device 10 in detail. The locking device 10 serves for temporarily securing the output shaft 26 against rotation so that the screw 69 can be released and fastened, for example, when exchanging the cutting wheel 7. The locking device 10 comprises a locking bolt 51 on which an actuating element 52 is secured. The actuating element 52 projects through the opening 61 into the exterior chamber 27. The locking device 10 has a bushing 54 which is seal-tightly pressed into a wall of the belt chamber 23, in this embodiment into the sealing rim 33. The bushing 54 can also be glued into the wall of the belt chamber 23 or can be secured in any other way seal-tightly in the wall of the belt chamber 23. The locking bolt 51 is slidably supported in the bushing 54 and, in the position illustrated in FIG. 15 in which it is pushed completely outwardly, is secured by spring ring 56 so as to prevent it from falling out. Relative to the bushing 54, the locking bolt 51 is sealed by a seal 55, in this embodiment an O-ring. The seal 55 is secured on the outer circumference of the locking bolt 51 in a groove. The locking bolt 51 is biased by a spring 53 which is designed as a coil pressure spring into its outwardly pushed position. When the locking bolt 51 is pressed against the force of the spring 53 into the support arm 5, it moves into a recess 28 of the output pulley 25 and blocks thereby rotational movement of the output pulley 25 and of the output shaft 26 until the locking bolt 51 is pushed outwardly again by the spring 53, for example, when the operator lets go of the actuating element 52.

In FIG. 15, the bearings 39 are also illustrated by means of which the drive shaft 26 is rotatably supported in the support arm component 15. At the seat of the bearings 39 on the output shaft 26 and in the support arm component 15, the metal of the bearings 39 is resting on the metal of the drive shaft 26 or support arm component 15. Since the metallic contact provides no air-tight connection, air can pass through between the outer rings of the bearings 39 and the support arm component 15 as well as between the inner rings of the bearings 39 and the output shaft 26; this allows for pressure compensation between the belt chamber 23 and the environment. Penetration of water or dirt is however not possible so that the belt chamber 23 is water-tight relative to splashing water and jets of water and is dust-tight.

Figure 18:
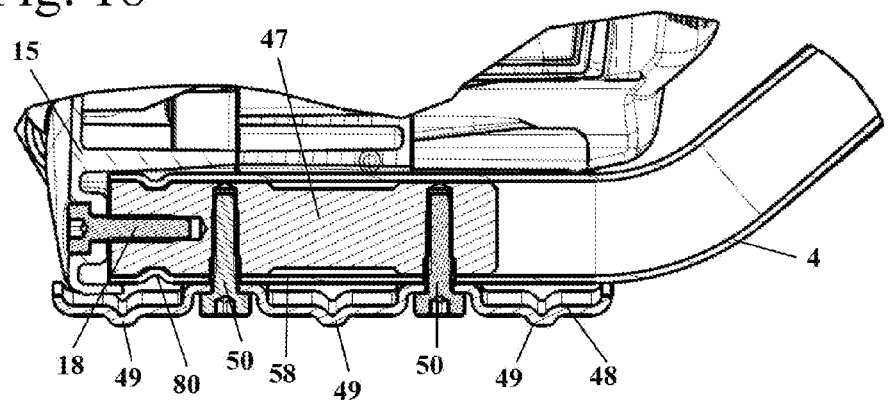
FIG. 18 is a detail section illustration along the section line XVIII-XVIII of FIG. 1.

FIG. 18 shows the fixation of the second end 58 of the handle 4 on the support arm component 15. At the second end 58 an insert 47 is pushed into the handle 4 and secured on the handle 4. In this embodiment, for this purpose a circumferentially extending constriction 80 on the handle 4 is provided which projects into an appropriate recess of the insert 47. The fastening screw 18 is screwed in at the end face into the insert 47 and secures therefore the insert 47 on the support arm component 15. On the insert 47, the cover 48 is also secured by means of two fastening screws 50. The cover 48 has raised portions 49 which serve as supporting leg for the cut-off machine 1.

The specification incorporates by reference the entire disclosure of German priority document 10 2013 012 746.7 having a filing date of Jul. 31, 2013.

While specific embodiments of the invention have been shown and described in detail to illustrate the inventive principles, it will be understood that the invention may be embodied otherwise without departing from such principles.

What is claimed is:

1. A hand-guided power tool comprising:
   a support arm;
   a tool member supported on the support arm;
   a drive motor;
   a drive belt driven in rotation by the drive motor and driving the tool member;
   the support arm comprising a belt chamber wherein the drive belt is arranged in the belt chamber;
   wherein the belt chamber is closed off relative to the environment and sealed off relative to the environment.

2. The power tool according to claim 1, wherein the support arm is comprised of a support arm component and a cover, wherein the support arm component and the cover delimit the belt chamber.

3. The power tool according to claim 2, further comprising a seal, wherein a circumferentially extending receptacle is formed between the support arm component and the cover, and wherein the seal is arranged in the receptacle.

4. The power tool according to claim 3, wherein the support arm component and the cover delimit, external to the belt chamber, an exterior chamber that surrounds the belt chamber at least partially in the area of the seal.

5. The power tool according to claim 4, wherein the exterior chamber has at least one opening that communicates with the environment and wherein the at least one opening is at least partially closed by a component projecting through the opening into the exterior chamber.

6. The power tool according to claim 4, wherein the support arm component has a first rim and the cover has a second rim, wherein the first rim is resting across at least a portion of the length of the first rim on the second rim, and wherein the exterior chamber is arranged between the belt chamber and the first and second rims.

7. The power tool according to claim 4, wherein the cover is secured by at least one fastening element on the support arm component and wherein the at least one fastening element extends through the exterior chamber.

8. The power tool according to claim 4, wherein the power tool has a water supply line for supply of water to the tool member and wherein at least one section of the water supply line is extending through the exterior chamber.

9. The power tool according to claim 2, wherein the power tool has a guard for the tool member and the guard partially covers the tool member, wherein the guard and the support arm component together form a monolithic part.

10. The power tool according to claim 2, wherein the power tool has a bow-shaped handle with a first end and a second end, wherein at least one of the first and second ends is secured on the support arm component.

11. The power tool according to claim 1, further comprising a locking device for the tool member, wherein the locking device has a locking bolt projecting through a wall of the belt chamber, wherein the locking bolt is arranged in the wall of the belt chamber so as to be longitudinally slidable, and wherein the locking bolt is sealed relative to the wall of the belt chamber.

12. The power tool according to claim 1, wherein the drive motor is secured fixedly on the support arm component.

13. The power tool according to claim 12, further comprising at least one fastening element that fixedly secures the drive motor on the support arm component, wherein the at least one fastening element projects into the belt chamber.

14. The power tool according to claim 1, further comprising:
   a drive pulley that is fixedly connected to a drive shaft of the drive motor and is arranged in the belt chamber;
   an output shaft that is fixedly connected to an output shaft and is arranged in the belt chamber;
   wherein the drive belt is guided across the drive pulley and the output pulley;
   wherein the drive shaft and the output shaft pass through a wall of the belt chamber;
   wherein the belt chamber is seal-tightly sealed at the drive shaft by at least one bearing of the drive shaft and is sealed at the output shaft by at least one bearing of the output shaft.

* * * * *